Sept. 1, 1959      H. W. ROCKWELL      2,901,844
AUXILIARY WHEELED SUPPORT FOR VEHICLES
Filed March 31, 1955      3 Sheets-Sheet 1
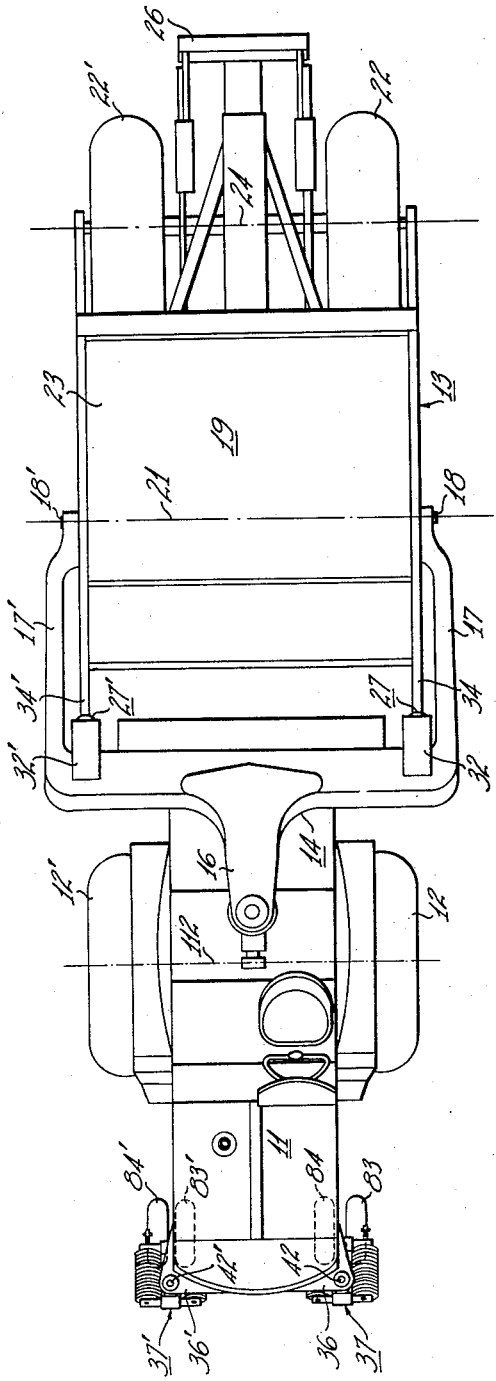
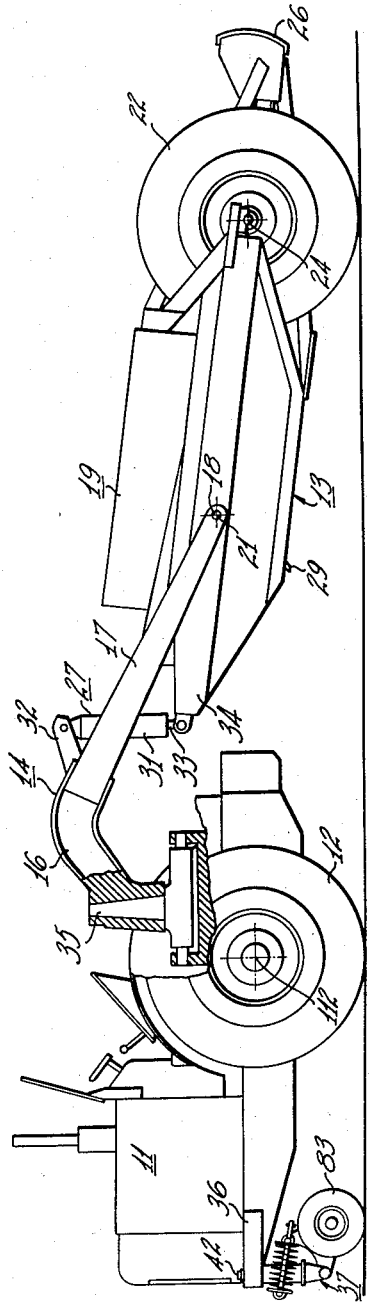
Fig. 2
Fig. 1
Inventor
Harvey W. Rockwell
by Charles L. Schwab
Attorney

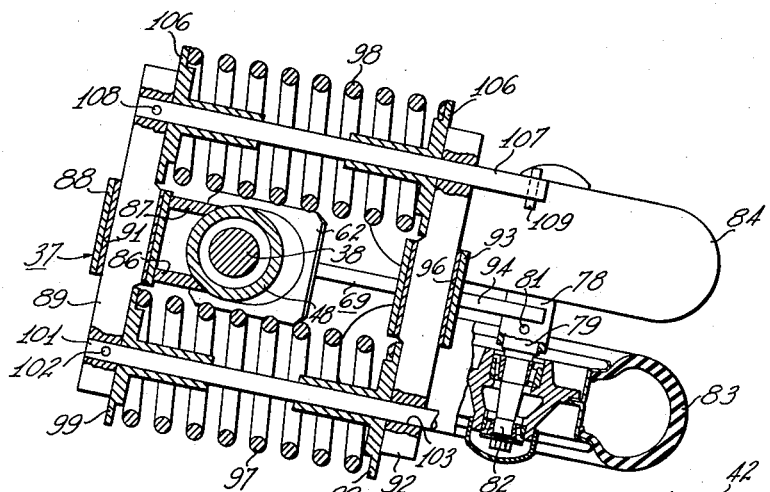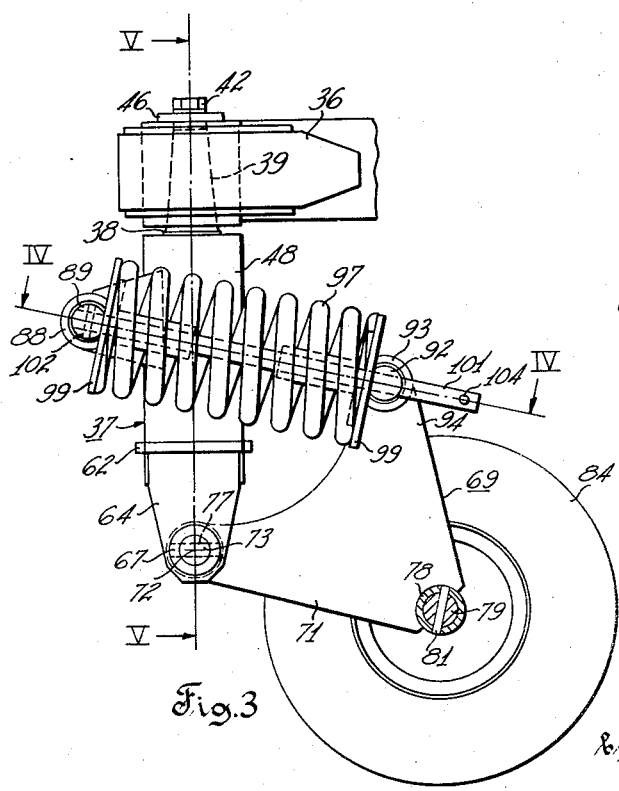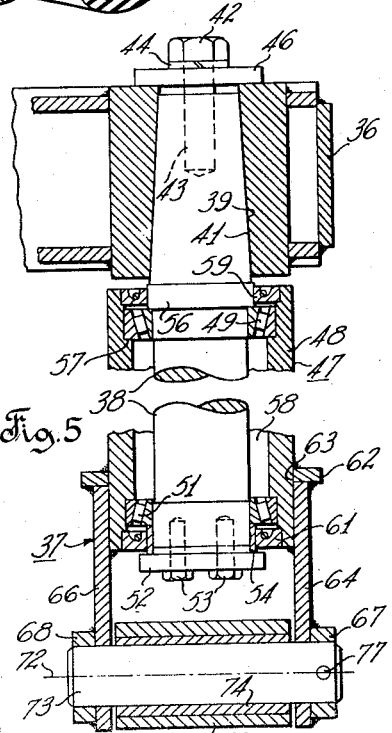

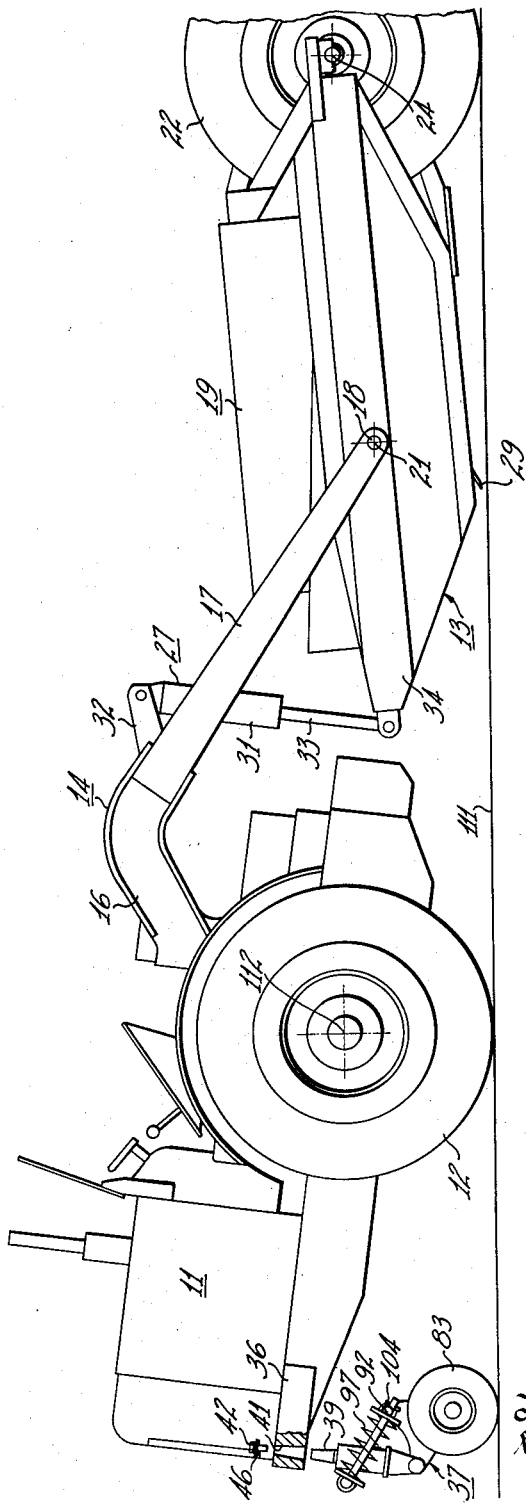

United States Patent Office 2,901,844
Patented Sept. 1, 1959

2,901,844

AUXILIARY WHEELED SUPPORT FOR VEHICLES

Harvey W. Rockwell, Cedar Rapids, Iowa, assignor to Allis-Chalmers Manufacturing Company, Milwaukee, Wis.

Application March 31, 1955, Serial No. 498,338

4 Claims. (Cl. 37—124)

This invention relates to land vehicles and it is concerned particularly with distributing the weight of a land vehicle so as to permit vehicles which otherwise have over weighted axles to travel on a highway subject to maximum weight laws.

The transporting of large earth handling equipment over the highways of the various States without exceeding the maximum axle loading permitted by the laws of the various States has long been a problem to the owners and manufacturers of such equipment. It has been common practice in the past to transport earth handling equipment with excess axle loading, such as tractor scraper units, on low boy semitrailer trucks and this entails considerable expense. Also transporting tractor scraper units or the like by loading partly or entirely on a semitrailer truck is not considered a particularly safe method of transporting such equipment.

Heretofore there has been a need for providing auxiliary ground engaging support means for large earth handling vehicles with an otherwise overloaded axle which would decrease the weight on the overloaded axle and permit the vehicle to travel under its own power and on its own wheels without interferring with the steering and braking of the vehicle.

It is an object of this invention to provide an auxiliary wheeled support for a vehicle which takes care of the hereinbefore outlined requirements and difficulties.

More particularly it is an object of this invention to provide an auxiliary caster attachment for a vehicle to distribute the weight of the vehicle so that its axle loading does not exceed the weight laws of the State in which it is operating.

It is a further object of this invention to provide an auxiliary caster which does not interfere with driving of the vehicle.

It is a further object of this invention to transfer the weight from an axle which is normally overweighted for highway transport to an axle or axles which are not overloaded, thereby providing axle loading which permits the vehicle to travel on highways without exceeding the maximum weight laws of the pertinent State.

It is a further object of this invention to provide an auxiliary caster attachment which, when attached to a normally overwight vehicle, permits the vehicle to travel on its own wheels and under its own power on highways subject to maximum weight laws.

It is a further object of this invention to provide an auxiliary caster for a vehicle which is easily installed and removed, is economical to manufacture and gives long trouble free service.

A further object of this invention is to provide a caster having support wheels in close lateral proximity to eliminate the need for providing oscillating means for the wheels.

A further object of this invention is to provide a caster with support wheels in close lateral proximity to minimize objectionable loading of the caster when traveling over uneven terrain.

A further object of this invention is to provide a caster with spring biased wheels which allows considerable vertical movement of the caster wheels during operation.

These and other objects of this invention will be apparent on reading the following description in conjunction with the drawings, in which:

Fig. 1 is a side view of a tractor scraper incorporating this invention;

Fig. 2 is a top view of the tractor scraper shown in Fig. 1;

Fig. 3 is an enlarged side view of an auxiliary caster attachment mounted on the front of the tractor unit with the left caster wheel removed;

Fig. 4 is a section view taken on line IV—IV in Fig. 3 and showing one of the caster wheels partly in section;

Fig. 5 is a section view taken on line V—V in Fig. 3; and

Fig. 6 is a slightly enlarged view of the tractor shown in Figs. 1 and 2 and showing the scraper bowl lowered and the auxiliary caster attachments removed from the tractor unit.

Referring to Figs. 1 and 2, an earth handling vehicle in the form of a tractor scraper is made up of a front unit 11 having a pair of traction wheels 12, 12' driven by an engine, not shown, and a rear trailer unit 13. The trailer unit 13 includes a hitch yoke 14 having a gooseneck 16 and a pair of rearwardly extending legs 17, 17'. The legs 17, 17' are pivotally connected by pivot pins 18, 18' to opposite sides of a scraper bowl part 19 of trailer unit 13. The pins 18, 18' lie on a common transverse pivot axis 21. The scraper bowl 19 has a pair of load supporting wheels 22, 22' mounted at the rear of the cargo carrying portion 23. Wheels 22, 22' are supported for rotation on a common axis 24 which is spaced a substantial distance rearwardly of axis 21. A push bumper 26 is provided at the rear of the scraper bowl 19.

A pair of vertically disposed hydraulic rams 27, 27' are provided for lowering the forward end of the bowl 19 to positions wherein a cutting edge 29 will penetrate the material being excavated and are also provided for raising the bowl 19 to a traveling position as shown in Fig. 1. Ram 27 has its cylinder 31 pivotally connected at its upper end to an overhanging bracket 32 rigidly secured to the yoke 14 and has its piston rod 33 pivotally connected to a forward reaching side 34 of the scraper bowl 19. Ram 27' is similarly connected to bracket 32' and bowl side 34'.

Referring to Fig. 1, a king pin 35 has a bottom portion pivotally connected to the main frame of the tractor unit 11 on a longitudinal axis and has an upright portion pivotally connected to the trailer gooseneck 16 on a vertical axis. This hitch connection puts the yoke 14 and the tractor unit 11 in vertically rigid, horizontally swingable relation to one another. A steering mechanism, not shown, is provided to angle the front unit 11 relative to the rear unit 13 about the vertical axis of the hitch pin 35. Any one of a number of steering mechanisms may be used to angle the tractor unit 11 relative to the scraper unit 13, as for instance, the steering mechanism shown in my United States Patent No. 2,638,998, issued May 19, 1953.

A pair of caster mounting brackets 36, 36' are secured, as by welding, to laterally opposite sides of the forward end of the tractor unit 11. A pair of caster units or attachments 37, 37' are secured to the brackets 36, 36' so as to transfer part of the weight which would otherwise be imposed on driving wheels 12, 12'.

Referring to Figs. 3, 4 and 5, the details of caster unit 37 are shown, it being understood that the caster unit 37' is similarly constructed. A vertical caster pin 38 has a conical wedging surface 39 at its upper end in wedging engagement with a complementary conical surface 41 formed in bracket 36. Wedging surfaces 39 and 41 are drawn into nonrotatable engagement by a bolt 42 threaded into a drilled and tapped hole 43. A lock washer 44 and a washer plate 46 are interposed between the head of bolt 42 and bracket 36. The caster 37 has a hitch part 47 presenting a sleeve 48 which is journalled on the caster pin 38 by a pair of taper bearings 49 and 51. A cap 52 is secured to caster pin 38 by a pair of bolts 53. Cap 52, in cooperation with a spacer 54, prevents bearing 51 and sleeve 48 from moving downwardly relative to caster pin 38. The inner raceway of bearing 49 abuts a flange 56 formed on caster pin 38 and the outer raceway of bearing 49 abuts a shoulder 57 within sleeve 48 so as to limit upward vertical movement of sleeve 48 relative to caster pin 38. An inner chamber 58 between caster pin 38 and sleeve 48 may be filled with lubricant to lubricate bearings 49 and 51 and the lubricant is maintained within chamber 58 by radial contact seals 59 and 61.

A generally square shaped plate 62 with a circular hole 63 is secured by welding to the outer side of sleeve 48. A pair of depending ears 64 and 66 are secured by welding at their upper ends to ring 62 at diametrically opposite sides of sleeve 48. The ears 64 and 66 are secured on their inner sides by welding to the bottom of sleeve 48. Pin mounting rings 67, 68 are secured by welding to the outer sides of lower ends of ears 64 and 66, respectively.

A wheel supporting arm 69 has a horizontally extending portion 71 radiating from the axis 72 on which it is pivotally supported on ears 64 and 66 by a pivot pin 73 extending through a bushing 74 and sleeve part 76 of arm 69. Portion 71 of arm 69 is secured by welding to sleeve part 76. Pivot pin 73 is locked to ring 67 by a small pin 77.

Referring to Figs. 3 and 4, a sleeve 78 is welded to the outward extending end of portion 71 of arm 69 and an axle 79 is nonrotatably secured within sleeve 78 by a pin 81. Axle 79 presents spindles at each of its opposite ends, only the left side spindle 82 being exposed in Fig. 4. A rubber tired wheel 83 is rotatably mounted on spindle 82 by a pair of taper bearings and another rubber tired wheel 84 is similarly mounted in close lateral proximity to rubber tired wheel 83 on the opposite end of axle 79.

A pair of braces 86 and 87 are welded to and extend outwardly from sleeve 48 and a sleeve 88 is rigidly secured to the outer ends of braces 86 and 87. A spring mounting shaft 89 is journaled in sleeve 88 by a bushing 91. A similar spring mounting shaft 92 is journaled by a bushing 96 within a sleeve 93 welded to an upward extending part 94 of arm 69.

A pair of coil springs 97 and 98 are interposed between flats formed on spring mounting shafts 89 and 92 so as to urge the wheels 83 and 84 downwardly. The coil springs 97 and 98 are respectively positioned on opposite sides of hitch part 47 and are disposed above the rubber tired wheels 83 and 84. Base plates 99 are positioned between the opposite ends of spring 97 and shafts 89 and 92, respectively. A spring mounting rod 101 is secured to shaft 89 by a pin 102 and extends through plates 99 so as to hold the plates 99 and spring 97 in their properly aligned positions. Rod 101 extends through a hole 103 in shaft 92 and has a cross pin 104 at its rearward end for limiting expansion of spring 97. Spring 98 is similarly positioned between a pair of base plates 106 which bear against flats formed on shafts 89 and 92, respectively. A shaft mounting rod 107 is secured at its forward end to shaft 89 by a pin 108 and has a cross pin 109 at its rearward end to limit expansion of spring 98.

As readily appears in Fig. 6, the caster units 37, 37' are easily detachable from and attachable to the tractor unit upon lowering the forward end of the scraper bowl a predetermined amount. As shown in Fig. 6 the rams, 27, 27' are in a substantially expanded condition and the cutting edge 29 is just short of an excavating position. Line 111 is a ground line. When the scraper bowl 19 is lowered, the pivot pins 18, 18' move downwardly thus rocking the vertically inflexible yoke 14 and tractor unit 11 about the axis 112 of the traction wheels 12, 12'. Such pivoting of the tractor unit 11 and yoke 14, when these units are in a generally straight line driving position, raises the front end of the tractor unit to a position in which the attached caster units 37, 37' do not engage the ground and may be removed from their brackets 36, 36' upon removal of bolts 42, 42'. In Fig. 6 the caster unit 37 is shown dropped downwardly from its connection with bracket 36 and the bolt 42, washer 44 and plate 46 have been withdrawn upwardly. Also in Fig. 6 it is seen that spring 97 has reached its limit position of expansion permitted by cross pin 104.

Thus it is seen that the caster units 37, 37' may be readily installed on or removed from the front end of the tractor unit 11 when the front end of the scraper bowl is in a lowered position.

A main purpose of this invention is to reduce the axle load on vehicles having an axle which is normally overloaded from the standpoint of the axle loading limitations imposed by the laws of the various States. Most of the States have laws restricting the axle loading permitted on their highways and a great many of these States permit no more than 18,000 pounds per axle. In an unloaded condition and without the caster units 37, 37' the vehicle illustrated in the drawings has a tractor axle loading of 25,450 pounds and a scraper axle loading of 13,100 pounds. Few, if any, States permit an axle loading of 25,450 pounds.

By installing the herein described caster units on the front end of the tractor and raising the bowl to a travel position, the coil springs of the caster units are compressed and weight is transferred from the tractor wheels 12, 12' to the caster wheels 83, 84, 83', 84' and the scraper wheels 22, 22'. The caster units each weigh 220 pounds and in the adjusted condition of the vehicle shown in Fig. 1, the caster wheels carry 9,200 pounds, the tractor wheels carry 14,400 pounds and the scraper wheels 15,400 pounds. Thus the axle loading has been reduced below the 18,000 pounds per axle limitation in most weight laws. It may be noted that the load on the rear axle has been increased from 13,110 pounds to 15,400 pounds and, therefore, it is evident that the spring suspended auxiliary caster wheels tend to rock the entire tractor scraper about axis 24 of the scraper wheels 22, 22'. In other words, part of the weight normally imposed on the tractor wheels 12, 12' has been transferred to the scraper wheels 22, 22' and part has been transferred to the auxiliary wheels 83, 84 and 83', 84'.

The spring suspension provided for the auxiliary caster wheels allows considerable vertical movement and permits the wheels to ride over usual road surface variations without appreciably changing the portion of the total weight of the vehicle which they carry.

It should be understood that it is not intended to limit the invention to the particular forms and details described hereinabove and that the invention includes such other forms and modifications as are embraced by the scope of the appended claims.

It is claimed and desired to secure by Letters Patent:

1. In an earth handling vehicle, the combination comprising: a front tractor unit having a pair of motor driven traction wheels; a rear trailer unit, said trailer unit including a bowl, a yoke having a pair of rearwardly extending legs pivotally connected to laterally opposite sides of said bowl on a horizontal transverse axis, a pair of ground engaging supporting wheels mounted on said bowl rearwardly of said transverse axis, and power means operatively interposed between said yoke and said bowl forwardly of said transverse axis for raising and lowering the forward end of said bowl; hitch means for connecting said yoke and tractor unit in vertically rigid and horizontally steerable relation to one another on a vertical pivot axis; and a caster including a frame mounting a ground engaging wheel and connecting means pivotally mounting said frame to said front tractor unit on a vertical axis spaced forwardly of said traction wheels, said ground engaging wheel of said caster carrying a substantial portion of the weight of said vehicle when said forward end of said bowl is in a raised position and said ground engaging wheel being raised from the ground when said forward end of said bowl is in a lowered position and said tractor and trailer units are in a straight line driving position thereby permitting operation of said vehicle in said bowl lowered position without removal of said caster.

2. The vehicle set forth in claim 1 including spring means operatively interposed between said tractor unit and said ground engaging wheel for biasing the latter downwardly.

3. In an earth handling vehicle of the type including a tractor unit propelled by a pair of traction wheels; a trailer unit having a bowl supported by a pair of supporting wheels, a yoke with a pair of rearwardly extending legs secured to the bowl on a horizontal transverse axis and power means operatively interposed between said yoke and bowl for raising and lowering the forward end of the bowl; and hitch means for connecting the yoke in horizontally pivotal, vertically rigid relation to said tractor unit, the combination comprising: a caster structure including a hitch part, means for pivotally connecting said hitch part to said front unit on a vertical caster axis spaced forwardly of said traction wheels, a wheel supporting arm pivotally mounted on said hitch part on a horizontal axis and having a first part extending horizontally and radially from said horizontal axis, a load carrying wheel rotatably supported on said first part on an axis spaced from said horizontal axis and spaced forwardly of said traction wheels, a second part formed on said arm having a portion disposed vertically above said horizontal axis and axis of rotation of said load carrying wheel, and a spring disposed above said wheel and operatively interposed between said portion of said second part and said hitch part for urging said wheel downwardly.

4. In an earth handling vehicle, the combination comprising: a front unit having a pair of motor driven traction wheels and a frame extending forwardly of said traction wheels; a rear trailer unit including a bowl, a yoke with a pair of rearwardly extending legs pivotally connected to laterally opposite sides of said bowl at points lying in a horizontal transverse axis, a pair of ground supporting wheels mounted on said bowl on an axis spaced from said transverse axis, and power means operatively interposed between said yoke and bowl for raising and lowering the latter; hitch means for connecting said yoke and tractor unit in vertically rigid and horizontally swingable relation to one another about a vertical pivot axis; a bracket on said frame presenting a tapered opening extending along a vertical axis; and a caster including pin member rotatably mounted within a sleeve member, one of said pin and sleeve members presenting a tapered attaching portion complementary to and engageable with said tapered opening, means for detachably maintaining said attaching portion in wedging engagement with said tapered opening, a lever arm having one end pivotally secured on a first horizontal axis to a bottom portion of the other of said members, a support wheel mounted on said lever arm for rotation about a second horizontal axis spaced horizontally from and parallel to said first horizontal axis, and spring means interposed between said other of the pin and sleeve members and said lever arm, and disposed vertically above the said first and second horizontal axes.

References Cited in the file of this patent

UNITED STATES PATENTS

| | | |
|---|---|---|
| 1,438,414 | Voegeli | Dec. 12, 1922 |
| 2,347,882 | Choate et al. | May 2, 1944 |
| 2,360,823 | Austin | Oct. 24, 1944 |
| 2,421,867 | Bizjak | June 10, 1947 |
| 2,511,866 | Mork | June 20, 1950 |
| 2,529,159 | Hyler | Nov. 7, 1950 |
| 2,538,704 | Pole | Jan. 16, 1951 |
| 2,633,366 | Armington | Mar. 31, 1953 |
| 2,650,440 | Quartullo | Sept. 1, 1953 |
| 2,659,583 | Dorkins | Nov. 17, 1953 |
| 2,669,314 | Quayle | Feb. 16, 1954 |
| 2,789,377 | Armington | Apr. 23, 1957 |
| 2,792,232 | Elmore | May 14, 1957 |

FOREIGN PATENTS

| | | |
|---|---|---|
| 82,374 | Austria | Jan. 10, 1921 |
| 422,211 | France | Jan. 13, 1911 |
| 668,250 | Great Britain | Mar. 12, 1952 |